Aug. 2, 1938.   J. S. McWHIRTER   2,125,456
VEHICLE MOTOR DRIVE EMPLOYING HERRINGBONE GEARS
Filed March 21, 1936   2 Sheets-Sheet 1

INVENTOR.
John S. McWhirter
BY
Darby & Darby
ATTORNEYS.

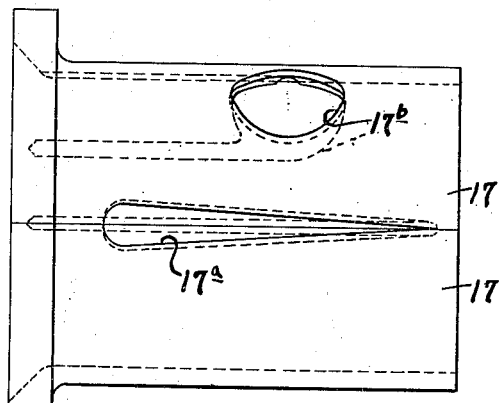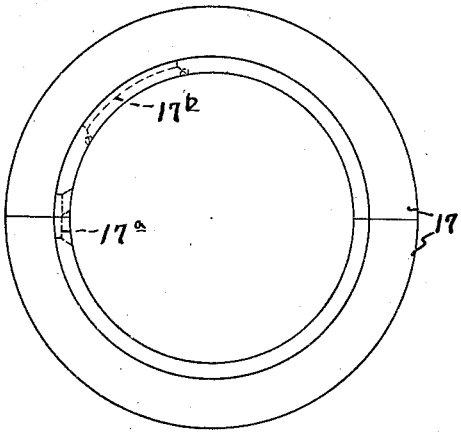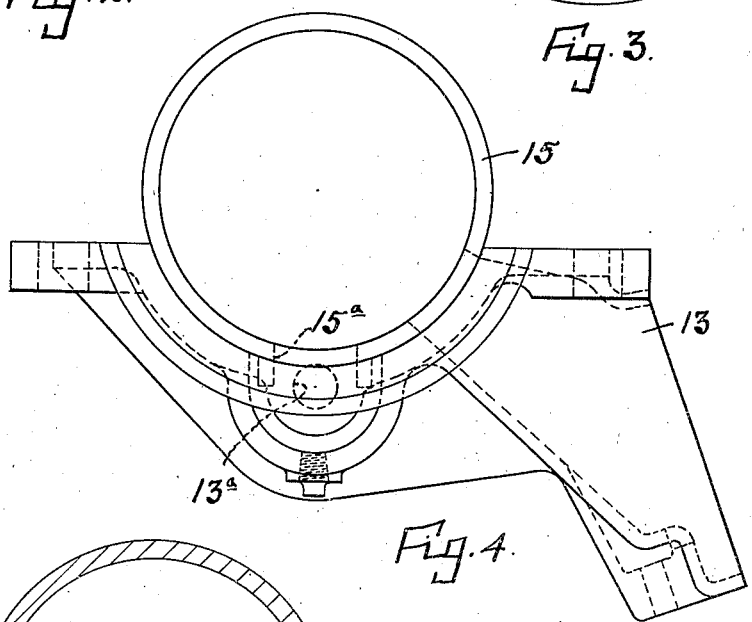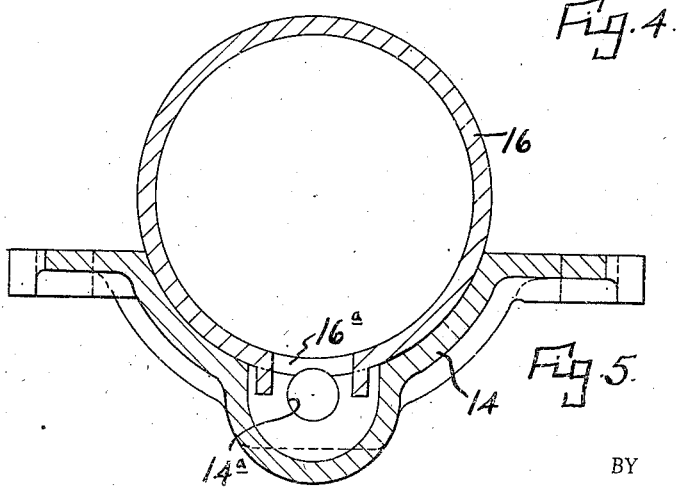

Patented Aug. 2, 1938

2,125,456

UNITED STATES PATENT OFFICE 2,125,456

VEHICLE MOTOR DRIVE EMPLOYING HERRING BONE GEARS

John S. McWhirter, Southport, Conn.

Application March 21, 1936, Serial No. 70,052

4 Claims. (Cl. 74—413)

This invention relates to motor drives for vehicles and particularly street cars and the construction thereof whereby the herring-bone gear train may be employed to interconnect the drive motor shaft and the vehicle axis.

The detailed objects of this invention will best be apparent from a detailed description of the invention when taken in connection with the attached drawings.

This invention resides substantially in the construction, combination, arrangement and relative location of parts, all in accordance with the following disclosure.

In the drawings,

Figure 2 is a side elevational view of the split bearing sleeves employed;

Figure 3 is an end elevational view thereof;

Figure 4 is an end elevational view of the bearing cap employed at the commutator end of the vehicle axle; and Figure 5 is a vertical cross-sectional view through the bearing cap employed at the pinion end of the vehicle axle.

Figure 1:
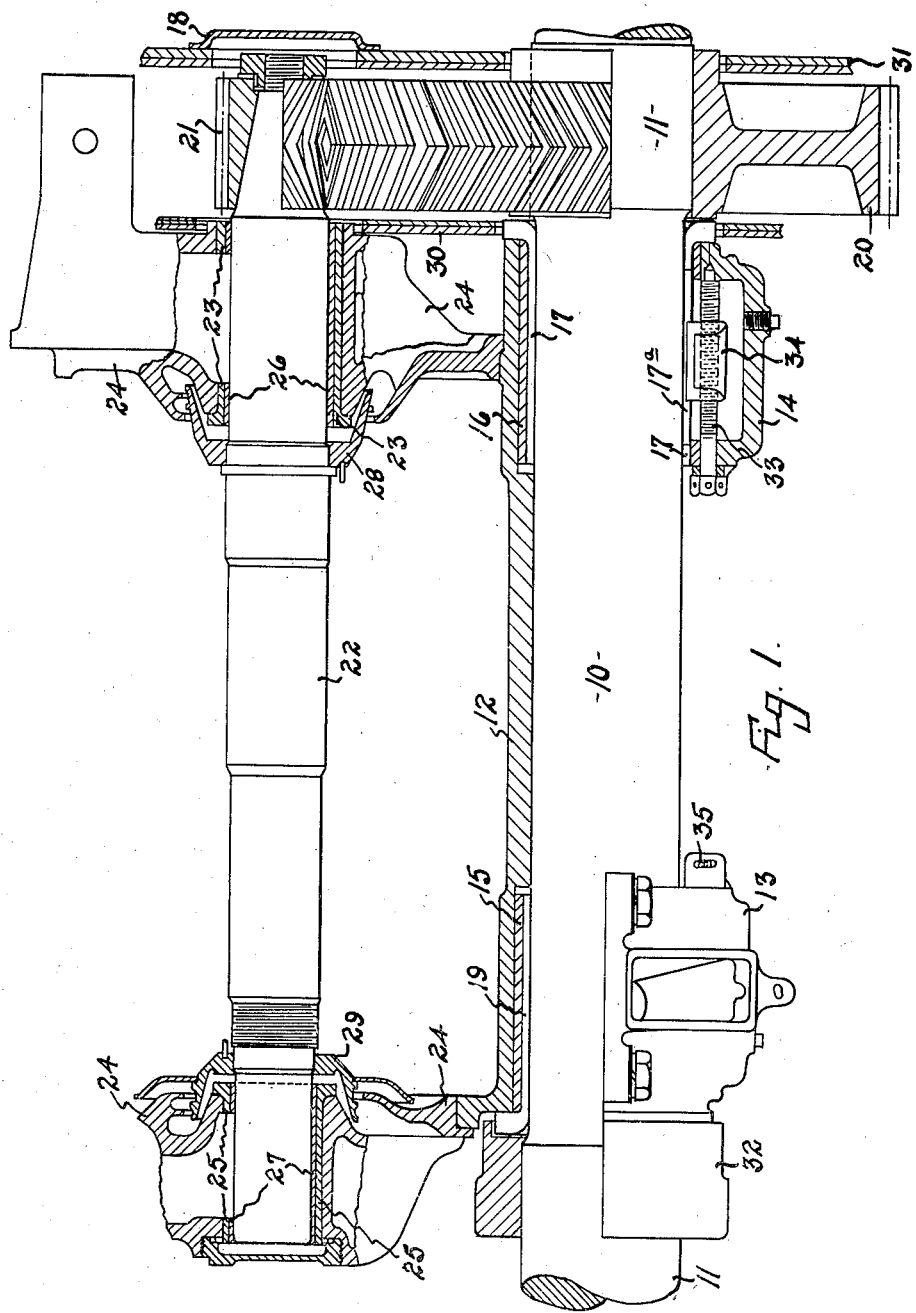
Figure 1 is a plan view with some parts broken away, and some parts in cross-section, of an arrangement in accordance with the invention.

It is common practice in the railway art, and particularly on street cars, to support the electric drive motors on the vehicle axles, and to connect the armature shaft of the motors with the vehicle axles by means of ordinary spur tooth or helical tooth gears and pinions. This type of gear and pinion has been employed on street cars among other reasons to permit of the relative endwise movement between the armature shaft and the vehicle axle inherent in such mechanism. End thrust bearings are commonly employed on the armature shaft to limit this endwise movement to a minimum.

An object of this invention is to employ herring-bone pinions and gears for connecting the armature shaft of a street car motor to the vehicle axle. There are many advantages in the use of herring-bone gears for this purpose as those skilled in the art, and particularly those familiar with the characteristics of such gears, will recognize. However, it has not heretofore been possible to employ herring-bone gears for interconnecting the armature shafts and axles of street cars because of the ever present inherent tendency of relative endwise movement therebetween. The shafts upon which meshing herring-bone gears are mounted must, in order to insure satisfactory operation of the gears and to maintain the wear thereon at a minimum, be mounted in the same plane and parallel to each other. It is also necessary that the shafts be maintained in this position during their use.

Herring-bone gear drives have not been used on street cars and similar vehicles because of the failure of the art to recognize a suitable form of bearing for supporting the motor housing on the vehicle axle and because of the lack of knowledge how to employ bearings suitable for the purpose in combination with the other elements to provide the correct operating conditions mentioned above. Herring-bone gear drives can be used for connecting street car motors to the car axles if means is provided to prevent relative endwise movement between the armature shaft and the vehicle axle while maintaining them parallel and in the same plane. It is hardly necessary to note that unrestrained relative endwise movement of this type would quickly wear the teeth of herring-bone gears and in many cases might quickly result in their complete destruction. It is essential that herring-bone gears run in the same plane and not be subjected to end thrusts of any substantial magnitude, due to relative endwise motion.

In accordance with this invention a particular type of bearing for supporting the motor housing on the car axle is employed which restrains the car axle against all relative endwise movement with respect thereto except that necessary for clearance. In addition, it is of such construction as to permit of mounting the motor housing on the car axle with a minimum of difficulty. In addition to the use of such bearings the armature shaft of the drive motor is mounted in the motor housing bearings so as to be freely movable in an axial direction with respect thereto for a distance greater than the clearance allowed between the car axle and the housing bearings plus the additional clearance between these parts which will gradually result from the wearing of the thrust surfaces which limit axial movement of the car axle with respect to the motor housing. By this arrangement the armature shaft is then substantially free of the motor housing in an axial direction so that the end thrusts on the herring-bone gears are reduced to a minimum.

The type of bearing which makes the use of herring-bone gears in such a combination possible, is illustrated in several forms in my issued patents, No. 1,684,405, dated September 18, 1928, for "Journal bearing construction"; No. 1,719,436, dated July 2, 1925, for "Securing device for axle bearing"; and No. 1,913,499, dated June 13, 1933, for "Bearings and methods of assembly thereof".

To facilitate an understanding of the full significance of the invention, a detailed description of one embodiment thereof will now be given.

In Figure 1 there is shown at 10 a central portion of a vehicle axle which, for example, may be the axle of a street car truck, on the outer ends of which will be mounted the flanged wheels, not shown. In accordance with common practice, the central portion of the axle is of smaller diameter than the portion 11 at the end thereof. This common construction prevents the use of solid bearing brasses and requires the use of split bearing brasses which may be mounted in place without passing them over the ends of the shaft. At 12 is shown a portion of the drive motor housing or shell which is of semi-circular cross-sectional form and rests upon the top of the shaft in conjunction with sleeve members which will shortly be described. The bearing caps, which are likewise of substantially semi-circular form, are illustrated at 13 and 14. These caps have secured therein the tubular members 15 and 16 respectively, as will be apparent from Figures 4 and 5. These tubular members are of sufficient internal diameter so as to slide over the enlarged ends 11 of the axle 10. Within the tubular member 16 are the split bearing members 17, the construction of which is illustrated in Figs. 2 and 3. These members comprise two semi-circular portions which meet together on faces which are diametrically opposed. Formed in the opposed faces on one side of the sleeve formed by a pair of these members is a tapered key slot 17a. The sleeve is provided with oil grooves 17b of any suitable form. At 19 is shown one-half of a similar pair of sleeve parts employed with the bearing at the other or commutator end of the axle.

Mounted on and secured to the axle is a herring-bone gear 20 which meshes with a herring-bone pinion 21, mounted on and secured to the armature shaft 22 of the drive motor. This shaft is journaled on bearings in the portion 24 of the motor housing, only parts of which are shown. In accordance with common practice, the portion 24 of the housing is separable from the portion 12 of the motor housing for convenience in mounting. The armature shaft 22 is mounted in bearing members 23 and 25 which are lined with a babbitt or other bearing material 26 and 27 in accordance with common practice. The ends of the armature shaft are provided with the usual combined oil seals and thrust collars 28 and 29. The bearing construction for the armature shaft forms no part of this invention by itself, and it is noted that any suitable form of bearing, such as those commonly employed, may be used with this invention. At 32 is a collar which is shrunk or otherwise held on portion 11 of shaft 10. At 30 and 31 are shown portions of the gear case. It will be noted that the outer portion 31 is provided with a cap 18 adjacent the end of the armature shaft which is formed to give sufficient clearance to allow the necessary axial movement of the armature shaft without striking the casing. A similar clearance is provided at the other end of the armature shaft. As will be clear from Fig. 1, the clearance between the bearings of the armature shaft and the combined oil seals and thrust collars is greater than the clearance between the housing bearings 13 and 14 and the collar 32 and gear 20. In fact, the former clearance is enough greater so as to allow for the normal wear on the thrust flanges of the bearing brasses 17 and 19 incident to continued use of the mechanism. The result is that none of the end thrusts caused by the operation of the vehicle wheels over the rails, switch frogs, and the like, and those produced by the tendency of the heavy motor housing to move in a direction parallel to the axis of the vehicle shaft, are transmitted through the herring-bone gears because, as stated above, the armature shaft is free of the motor housing in an axial direction within the limits defined above. This not only insures a maximum life for the herring-bone gears but is essential to their use for this purpose.

In the assembly of this mechanism the bearing caps 13 and 14 are slipped over the ends of the axle 10 so that it passes through the tubular members 15 and 16 secured to the caps respectively. The split bearing parts 17 and 19 are then slipped in place between the tubular members and the shaft. The motor housing is then placed on the shaft and the cap members are then bolted in place on the motor frame 12. Within each cap member is a longitudinally slidable wedge 34 which is threadedly mounted on the bolts 33 and 35, respectively. The bolt 33 is mounted in holes 14a in the cap 14, see Figure 5, and the bolt 35 is mounted in holes 13a in the cap 13, see Figure 4. These bolts are merely journaled in the caps and do not have any movement of their own other than a rotary movement. As is clear from Figures 4 and 5, the sleeve 14 is provided with a slot 15a through which the wedge key may extend into the wedge shaped slot of the split bearing parts. A similar slot 16a is formed in the tubular member 16 of the cap 14. These wedges fit in the slots 17a of the split bearing parts. When the bolt 33 is rotated in the proper direction it draws the wedge 34 along the converging slot 17a towards the narrow end thereof, expanding the bearing parts 17 (or 19) so that they fit tightly within the tubular member 16 (or 15). This securely locks the split bearing parts in the tubular members, and between the fixed collar 32 and the gear 20 when it is mounted in place on the axle 10.

From the above description it will be apparent that this invention resides in certain principles of construction and association of parts which may be varied by those skilled in the art without departure from the scope of this invention.

I do not therefore desire to be strictly limited to the disclosure as given for purposes of illustration but rather to the scope of the appended claims.

What I seek to secure by United States Letters Patent is:

1. In an apparatus of the type described, the combination including a vehicle axle, a motor housing journalled on said axle, thrust collars on said axle, thrust bearings lying between said collars and housing, the said bearings being fixed to said housing and designed for a predetermined wear, an armature shaft journalled in said housing, the said shaft being provided with end play in excess of the axial movement of said housing after the predetermined wear of said bearings, and a herring-bone gear train interconnecting said axle and shaft.

2. In an apparatus of the type described, the combination including a vehicle axle, a motor housing, bearing journals secured to said housing and surrounding said axle, thrust collars on said axle, split bearing members mounted in said bearing journals and providing thrust bearings lying between said collars, said thrust bearings being designed for a predetermined wear, means for locking said bearing members in said bearing journals, an armature shaft journalled in said housing, the said shaft being provided with end play in excess of the axial movement of said housing after the predetermined wear of said thrust bearings, and a herring-bone gear train interconnecting said axle and shaft.

3. In an apparatus of the type described, the combination including a vehicle axle, a motor housing, bearing journals secured to said housing, tubular sleeves in said bearing journals, split bearing members mounted in said tubular sleeves and providing thrust bearings lying between said collars, said thrust bearings being designed for a predetermined wear, means for locking said bearing members in said sleeves, an armature shaft journalled in said housing, the said shaft being provided with end play in excess of the axial movement of said housing after the predetermined wear of said thrust bearings, and a herring-bone gear train interconnecting said axle and shaft.

4. In an apparatus of the type described, the combination including a vehicle axle, a motor housing, bearing journals secured to said housing, tubular sleeves in said bearing journals, split bearing members mounted in said tubular sleeves and providing thrust bearings lying between said collars, said thrust bearings being designed for a predetermined wear, wedge keys engaging said split bearings to lock them in said sleeves, an armature shaft journalled in said housing, the said shaft being provided with end play in excess of the axial movement of said housing after the predetermined wear of said thrust bearings, and a herring-bone gear train interconnecting said axle and shaft.

JOHN S. McWHIRTER.